United States Patent [19]
Chen et al.

[11] Patent Number: 5,363,020
[45] Date of Patent: Nov. 8, 1994

[54] ELECTRONIC POWER CONTROLLER

[75] Inventors: Nian Chen; Dudley G. Boyd, both of Memphis, Tenn.

[73] Assignee: Systems and Service International, Inc., Memphis, Tenn.

[21] Appl. No.: 14,366

[22] Filed: Feb. 5, 1993

[51] Int. Cl.$^5$ .............................................. H05B 41/36
[52] U.S. Cl. .................................. 315/209 R; 315/307; 315/247; 315/DIG. 7; 315/219; 315/224; 315/244; 315/309
[58] Field of Search ......... 315/307, 291, 247, DIG. 5, 315/DIG. 7, 209 R, 219, 224, 244, 309, 208

[56] References Cited

U.S. PATENT DOCUMENTS

| | | | |
|---|---|---|---|
| 4,277,728 | 7/1981 | Stevens | 315/247 |
| 4,375,608 | 3/1983 | Kohler | 315/209 R |
| 4,414,493 | 11/1983 | Henrich | 315/219 |
| 4,503,361 | 3/1985 | Hanlet | 315/219 |
| 4,523,131 | 6/1985 | Zansky . | |
| 4,918,569 | 4/1990 | Maeda et al. | 315/219 |
| 4,958,106 | 9/1990 | Hendrix et al. | 315/208 |
| 5,049,790 | 9/1991 | Herfurth et al. | 315/307 |
| 5,189,343 | 2/1993 | Pacholok | 315/209 R |
| 5,225,742 | 7/1993 | Beasley | 315/307 |

FOREIGN PATENT DOCUMENTS 0449168 10/1991 European Pat. Off. .

OTHER PUBLICATIONS

Electronic Ballast Controller, Jul. 1992, Micro Linear.

*Primary Examiner*—John T. Kwon
*Attorney, Agent, or Firm*—Richard L. Myers

[57] ABSTRACT

An electrical power controller includes a boost converter, an invertor and an output section. The boost converter includes a control circuit which charges a capacitance from an inductance in accordance with a stream of pulses having a variable duty cycle. A feedback circuit responsive to the power consumed by a load provides an error signal for varying the duty cycle of the pulses. In the invertor, a pair of switches sample the charge on the capacitor to create an AC signal which is introduced to the output section. The sampling frequency in the boost converter is related to the sampling frequency in the invertor by an integer.

27 Claims, 5 Drawing Sheets

ELECTRONIC POWER CONTROLLER

BACKGROUND OF THE INVENTION

1. Field of the Invention

This invention relates generally to high power factor, pulse width modulated, power controllers, and more specifically to electronic ballasts for discharge lamps.

2. Discussion of the Prior Art

Electronic ballasts function primarily as power supplies for discharge lamps, which represent one of the most difficult loads to control. Problems associated with power factor, efficiency, harmonics, RFI/EMI, system control, soft-starting, fault protection management, reliability, and lamp arc current crest factor, must all be addressed by a modern ballast system.

In an electric power distribution line, the power factor is the ratio of real power (watts) to apparent power (volt-amperes). The optimum value for this ratio is unity (1.00), a value that is obtained only when the line current is sinusoidal and in phase with the line voltage; assuming, of course, that the line voltage is itself sinusoidal. This means that any current component in quadrature with the fundamental, and any components at frequencies other than the fundamental (harmonics), cannot carry power to the load. However, these components contribute to total line losses, and because they add to the current actually required by the user, they mandate the use of heavier wiring and circuit breakers, all of which equates to increased installation costs.

In the past, the main cause of low power factor was phase lag was caused by the inductive characteristic of the electric ballasts. This phase lag accounted for a large portion of the overall load serviced by the electric power companies. In this case, the power factor is equal to the cosine of the phase angle; a power factor of unity results when the angle is zero. Phase lag can be corrected by simply adding the right amount of capacitance in shunt with the offending equipment, as has been done for many years.

More recently, there has been an enormous increase in the number of electronic ballasts incorporating line rectifiers followed by capacitor input filters. As a result, the nature of the problem has changed from strictly a voltage-current-phase relationship to a concern for the effects of harmonics.

The current drawn by these circuits is distinctly non-sinusoidal because the distorted current waveform is the sum of many components of different frequencies, the one at the fundamental line frequency being the useful. The resulting power factor may be as low as 50% under these conditions. Where there are dozens, and more likely hundreds, of electronic ballasts within a single facility, it is imperative for electronic ballast manufacturers to search for some means for improving the low power factor. In addition, there are sensitive medical, laboratory or military environments where the allowable percentage of harmonics and RFI/EMI in the line current are extremely low. In these systems, the need for a high power factor, low harmonic and low RFI/EMI topology is a necessity.

Electronic ballasts have evolved through three distinct generations. First generation electronic ballasts included convention invertor design that provided for the conversion from low frequency $V_{ac}$ to pulsating $V_{dc}$. This conversion was accomplished by means of a rectifier bridge, "bulk" filter capacitance to smooth the pulsating $V_{dc}$ and then conversion from $V_{dc}$ to high frequency $V_{ac}$ by means of a self-oscillating invertor which was coupled to the lamp load. In this generation of electronic ballasts the load draws current as needed from the "bulk" capacitor, while the full-wave rectifier replenishes the capacitor at each half cycle with bursts of current that occur briefly at the voltage peak. In such a system, the output voltage is unregulated, and the input AC current is badly distorted. The weakness of this approach is low power factor, high harmonic distortion of the line current, high RFI/EMI, instant starting of lamps, high lamp arc current crest factor, poor light output regulation, poor system control, high component stress, virtually no fault protection management and poor system reliability.

A second generation electronic ballast included the same basic invertor design except with the addition of large and expensive RFI/EMI filters. The second generation electronic ballasts have all of the weaknesses mentioned for the first generation with the exception of improved power factor and lower RFI/EMI. In addition to all of the other weaknesses mentioned above, high harmonics continue to be a problem with the second generation electronic ballasts.

Third generation electronic ballasts introduced pre-regulator converter topologies that convert low frequency $V_{ac}$ to a relatively flat $V_{dc}$ with less distortion to the input line current waveform. The $V_{dc}$ is typically applied to a "semi-synchronized" or "un-synchronized" high frequency half bridge invertor which is coupled to the lamp load.

Semi-synchronized means that the converter and the invertor are operating at the same frequecy and therefore the converter and invertor are not synchronized due to the bridge topology of the secondary output stage. In order to achieve operation at the same frequency the invertor must switch-on twice for every time the boost converter switches on once. The weakness in this type of semi-synchronized operation is that there is more noise put back on the line. Furthermore, the switching noise generated by the invertor can contaminate the system control circuitry and cause premature failure. Other problems which these electronic ballasts include the lack of both voltage and frequency control during starting and running modes, less efficient peak current mode control of the pre-regulator converter, discontinuous operation of the inductor current and subsequently higher component stress, higher RFI/EMI, higher harmonic distortion of the line current, no invertor dead-time control due to single output drive to the bridge, less than optimum lamp arc current crest factor, and limited applications.

Un-synchronized means that the pre-regulator converter and the output invertor are running at completely different frequencies. In addition to having the weaknesses of the semi-synchronous ballasts mentioned above, other weaknesses include instant starting of lamps, no dimming capabilities, limited fault protection management, and poor reliability. Noise immunity measures within the circuit are more critical because the completely random switching transients generated by the self oscillating invertor have a higher probability of introducing spurious control signals to the system. This typically results in loss of system control and possible component failure. Both un-synchronized and semi-synchronized electronic ballasts change only the frequency to start and control the load. Due to the frequency modulation found in both types of ballast, RFI/EMI filter design optimization is more difficult and costly.

With regard specifically to discharge lamps, there has always been a need to start the lamp as gently as possible, to provide stable operation of the lamp with a lamp arc current crest factor as close to 1.00 as possible, and at the same time to minimize RFI generated by the lamp.

SUMMARY OF THE INVENTION

In accordance with the present invention, discharge lamps are soft started and operated with lamp arc current crest factors as low as 1.08. This is achieved while maintaining high efficiency, high system power factor, reducing harmonic distortion, and reduced RFI/EMI both on line and form the lamp. This invention eliminates line current distortion with a high power factor, average current mode controlled pre-regulator which forces the current to have the same wave shape as that of the line voltage. The same pre-regulator is used to sense and regulate the output voltage. Further, the pre-regulator is operated at twice the frequency of the coupled invertor to achieve full synchronization, and controlled by voltage and current feedback loops which change both the output voltage and frequency in response to changes in the status of the load. These feedback lops include the following:

1. A Current Feedback Loop from the boost inductor to the pulse width modulator (PWM) pre-regulator;
2. A unique Feedback Loop including two branches that are summed, with an output to the voltage control circuitry. The first branch includes a Voltage Feedback Loop from a bulk capacitor to a summing circuit. The second branch includes a Current Feedback Loop from the load to the summing circuit.
3. A Current Feedback Loop connecting from the load to the system frequency control circuitry.

The current feedback loop signal from the boost inductor is processed and supplied to the high power factor PWM pre-regulator which controls the amount of current drawn to replenish the bulk filter capacitor. By sensing and controlling the average current rather than peak current, as is done n the prior art, the PWM pre-regulator maintain the same, extremely low level of distortion in line current over a full range of current values, even though the required boost inductor value is quite low. This meant that the mode boundary between continuous and discontinuous modes, that is inevitable at some low current values, is of no concern since the loop controls the average values of current. This concept also includes the capability of operating the pre-regulator converter in either the continuous or discontinuous mode.

Since load current varies before, during and after lamp ignition, a load current control feedback loop is summed with the bulk filter capacitor voltage feedback loop, and the output is used to vary the duty cycle of the converter. This changes the bulk filter capacitor voltage to optimize circuit control. As a consequence, variations in the line and load are tracked along at least three independent feedback paths so that rapid changes to the line and load can immediately result in constant applied power. With specific regard to the starting and control of discharge lamps, this control circuitry provides for the gentle ramping up of the voltage to the lamp until the lamp starts. After ignition the load changes significantly and both the voltage and frequency in the system adjust to operate the lamp at its optimum frequency and proper power level. Typically, the optimum frequency for starting the lamp is slightly less than one-half the resonant frequency to the electronic ballast under open circuit conditions. The optimum frequency for running the lamp is established by setting the frequency near the peak of the resonant invertor after the lamp has started. This peak is to necessarily the resonant frequency. In a preferred embodiment, during the starting of the lamp, the load current signal is predominant over the voltage signal from the bulk capacitor; after the lamp has started the signal from the bulk capacitor is predominant over the load current signal. The variable voltage control is of particular advantage because it contains all of the necessary information to continuously optimize the ballast circuit.

A load current feedback loop to the frequency control circuitry adjusts the operating frequency of the pre-regulator converter and a signal one-half the converter frequency is supplied to the invertor. While the switching frequencies of the converter and invertor are preferably synchronized; they may differ by a multiple to increase the flexibility of the circuit and optimize the function of both the boost converter and invertor. In the case of electronic ballasts, the pre-regulator converter is preferably operated at twice the frequency of the invertor section to reduce the size of the magnetic components while operating the lamp between 20 and 30 KHz. Typically, as long as the converter runs at double the frequency of the invertor, or more, there is less danger of generating parasitic noise.

To achieve complete switching synchronization a 2:1 ratio is preferably maintained between the pre-regulator converter and invertor frequencies. As an example, the invertor output may be operated at 50 kHz and the boost converter operated at a synchronized 100 kHz. This higher converter frequency contributes to reducing the potential noise contamination of the circuit as well as the size of the pre-regulator converter reactive components. It also makes it easier to operate the inductor in a more efficient continuous mode. Additional benefits of operating the inductor in a continuous mode are high efficiency, less stress on the boost converter power switch and bulk capacitor, and less noise on the line. In many applications the noise on the line is so low that the system can be operated with no line filters at a substantial savings.

In addition to these features, this concept incorporates line voltage feedforward for worldwide voltage capability. This also stabilizes the voltage control loop gain which would otherwise vary with the square of the line voltage. It provides fast constant power control when the line voltage varies, and also accounts for the wide range of input voltages that the pre-regulator can accommodate without adjustment. This feature can be better understood with reference to technical paper, SEM-600A-1988, by Lloyd Dixon, Jr. of Unitrode, entitled "High Power Factor Pre-regulators for Off-Line Power Supplies", which is incorporated herein by reference.

These and other features and advantages of the invention will be more apparent with the discussion of preferred embodiments of the concept and reference to the associated drawings.

DESCRIPTION OF THE DRAWINGS

FIGS. 3–12 are waveforms each providing a plot of an electrical parameter against a common abscissa representing time;

DESCRIPTION OF PREFERRED EMBODIMENTS

Figure 1:
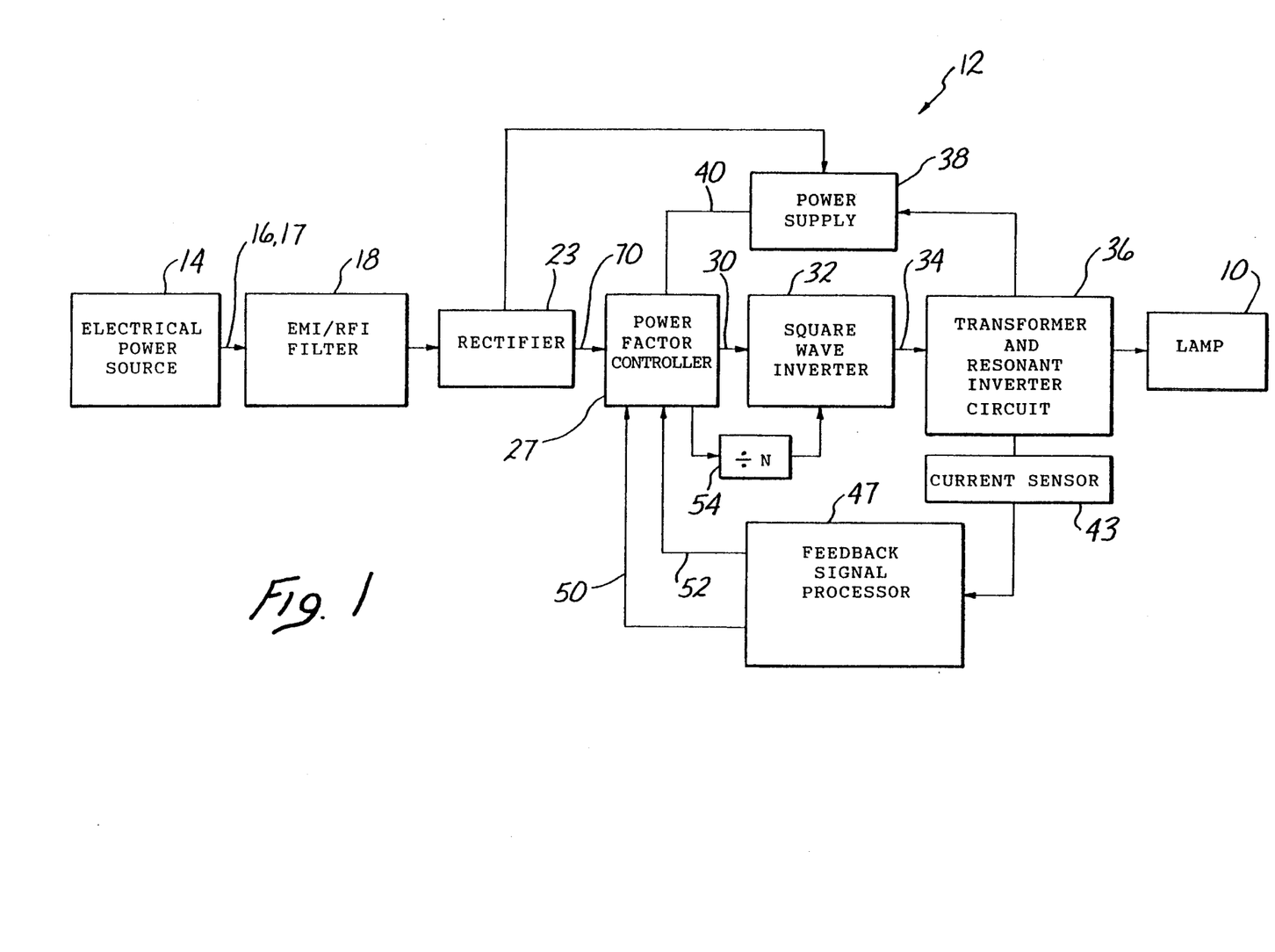
FIG. 1 is a block diagram of a ballast for controlling operation of a discharge lamp, the ballast including a novel feedback signal processor, and power factor controller.
Figure 3:
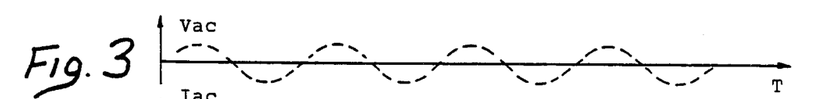
FIG. 3 is a plot of the line voltage $V_{ac}$ introduced to the ballast of the present invention.
Figure 4:
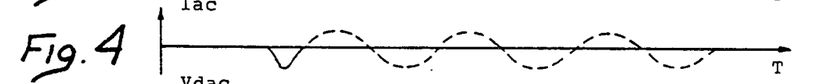
FIG. 4 is a plot of the line current $I_{ac}$ introduced to the ballast of the present invention.

A fluorescent lamp is illustrated schematically in FIG. 1 and designated generally by the reference numeral 10. The lamp 10 may include one or more fluorescent lamps but is generally representative of any discharge lamp or any other load requiring a ballast 12. The ballast controls the operation of the lamp 10 and is powered by an electrical source 14 which typically provides an alternating current $I_{ac}$ at a voltage $V_{ac}$ of 120 volts and a frequency of 50 or 60 Hz. These electrical parameters $V_{ac}$ and $I_{ac}$ are plotted in FIGS. 3 and 4 respectively. This line voltage is introduced on lines 16, 17 into a filter 18 which limits the feedback of radio frequency interference (RFI) and electromagnetic interference (EMI) from the ballast 12 into the power system or source 14. The filter 18 also protects the internal components of the ballast 12 from line transients associated with the source 14.

Figure 5:
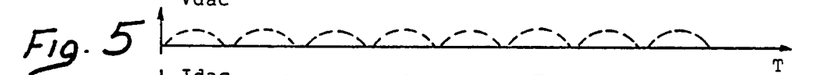
FIG. 5 is a plot of the rectified voltage $V_{dac}$ produced after the input bridge in the ballast.
Figures 6, 7:
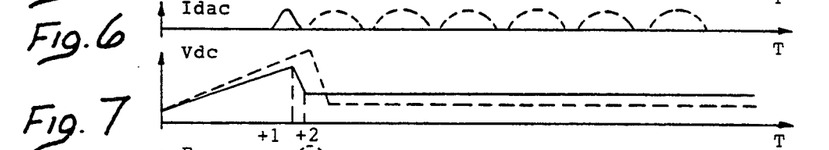
FIG. 6 is a plot of the rectified current $I_{dac}$ produced in the ballast after the bridge.
FIG. 7 is a plot of a DC voltage $V_{dc}$ at the bulk capacitor.
Figure 8:
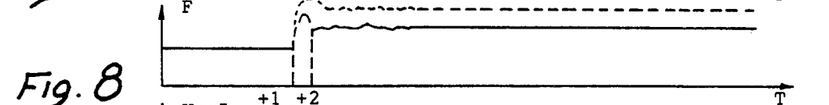
FIG. 8 is a plot of the frequency changes that occur with starting, running and changes in the load.

The output of the filter 18 is introduced to a rectification circuit 23 which converts the AC voltage into a rectified voltage $V_{dac}$ and current $I_{dac}$ which are plotted in FIG. 5 and 6 respectively. This rectified voltage $V_{dac}$ is fed to a power factor controller 27 which is of particular interest to the present invention. In a manner discussed in greater detail below, the power factor controller 27 provides for power factor correction and produces a variable DC voltage $V_{dc}$ which is introduced on a conductor 30 to a square wave invertor 32. A representative plot of this voltage $V_{dc}$ is shown in FIG. 7. Under normal conditions the controller 27 provides for "soft starting" of the lamp 10 and maintains a low power line harmonic content with constant power and light output. However, in the event of an electrical "brown-out" the controller 27 reduces the power and light output until low voltage circuitry turns the system off.

The invertor 32 converts the variable DC voltage into a high frequency AC voltage which powers the lamp 10. This voltage is introduced on a conductor 34 to a transformer and resonant invertor circuit 36 which provides isolation and the proper impedance for regulation of a load, such as the lamp 10. A power supply 38 receives input from the rectification circuit 23 and the transformer 36, (with leakage inductor built in) and the secondary of the transformer is connected to a resonant capacitance 117 and provides its output $V_{cc}$ to the controller 27 on the conductor 40.

A feedback circuit includes a current sensor 43 which generates a signal representative of the lamp arc current $I_{acl}$. This signal is introduced to a feedback signal processor 47 which includes both frequency and voltage control circuits that affect the voltage of the DC output $V_{dc}$ from the controller 27. For example, the feedback signal processor 47 enables the controller 27 to provide the DC voltage $V_{dc}$ with variable amplitude characteristics.

A signal representative of the desired DC voltage characteristics is provided to the controller 27 on a conductor 50, while a signal representative of the desired frequency of operation is provided to the controller 27 on a conductor 52. The relatively high frequency synchronization signal produced by the controller 27 is reduced in a divider 54 which controls operation of the invertor 32.

Figure 2:
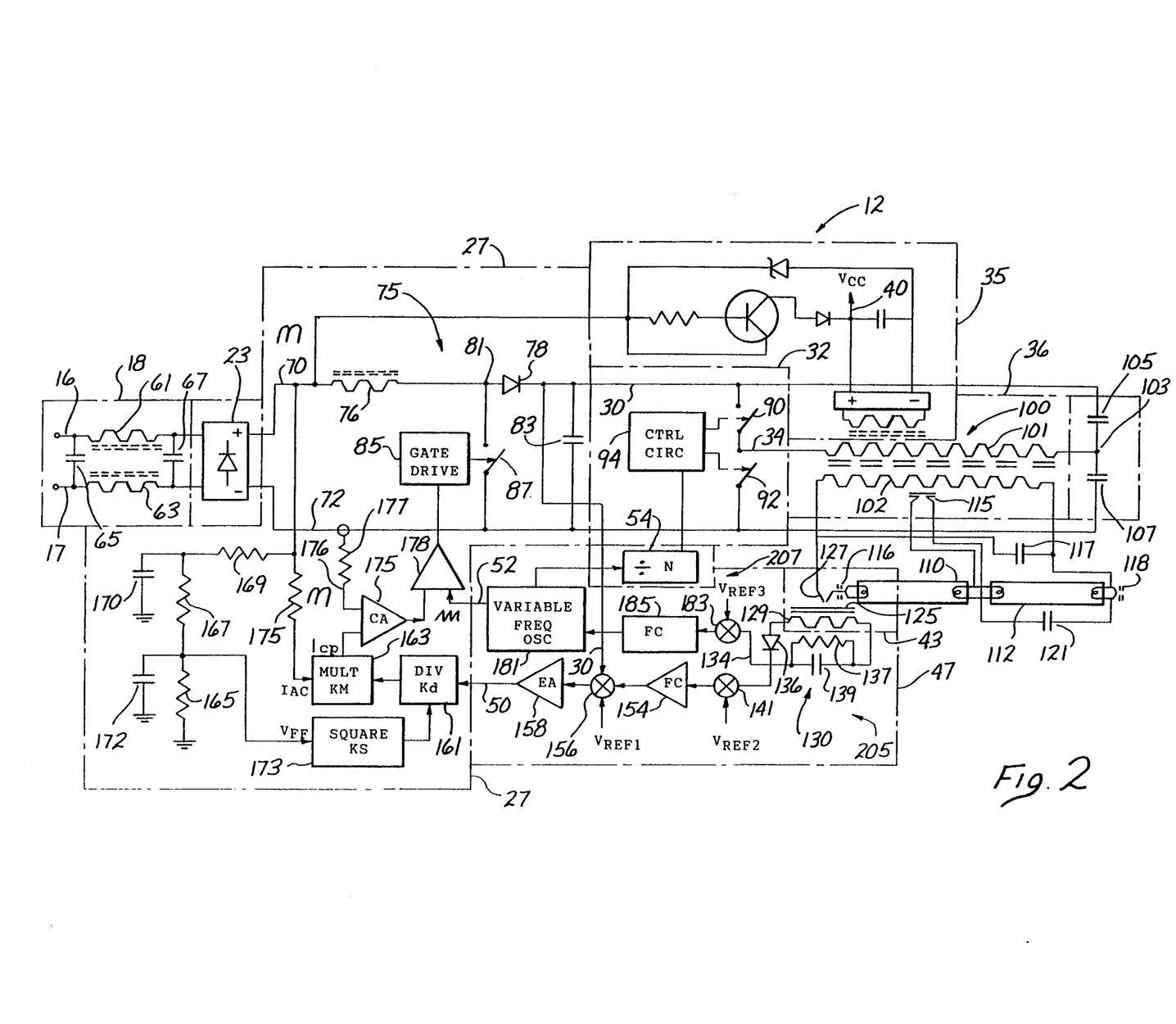
FIG. 2 is a detailed schematic of a preferred embodiment of the ballast illustrated in the block diagram of FIG. 1.

With reference to the detail of FIG. 2, it will be apparent that the RFI/EMI filter 18 can be of a conventional form including a pair of inductors 61, 63 connected respectively in series with the input lines 16, 17, and a pair of capacitors 65, 67 connected across the lines 16, 17 on opposite sides of the inductor 61, 63. In a preferred embodiment, the inductors 61, 63 and the capacitors 65, 67 each have a value consistent with both input and running, current and frequencies for any given design. These elements 61–67 provide suitable transient protection from the ballast circuit 12 as well as power source 14. For example, the ballast 12 is protected from transients in the line current $I_{ac}$ and the line voltage $V_{ac}$. The filter 18 also protects the power source 14 from the high frequencies present in both the power factor controller 27 and the invertor 32.

The power signal from the filter 18 is introduced to the rectification circuit 23 which may include a full bridge rectifier. At the output of the rectification circuit 23, a conductor 70 provides the rectified voltage $V_{dac}$ and current $I_{dac}$ relative to a ground potential which is provided throughout the ballast circuit 12 on a conductor 72.

The power factor controller 27, includes a pre-regulator converter designated generally by the reference numeral 75. This converter 75 includes an inductor 76, a diode 78, a bulk capacitor 83, a gate drive 85 and a power switch 87. The inductor 76 and the cathode of the diode 78 are connected at a common terminal 81 and in series with the conductor 70. The bulk capacitor 83 is connected between the anode terminal of the diode 78 and the ground conductor 72. The gate drive 85 controls operation of the power switch 87 which is connected between the terminal 81 and conductor 72.

The function of the inductor 76, the capacitor 83., the diode 78 and the switch 87 is of particular significance to the power factor controller 27. In a preferred embodiment, the inductor 76 and the capacitor 83 have values of about 5 mH and about 100 $\mu f$, respectively. When the power switch 87 is closed, current flows through inductor 76, through the power switch 87 to the ground conductor 72. As this current passes through the switch 87, energy is stored in inductor 76. Then, when the power switch 87 is opened, the energy stored in the inductor 76 as well as the energy supplied by the input line, is delivered to capacitor 83.

Thus, operation of the power switch 87 with a boost converter topology produces a boosted or elevated voltage across the capacitor 83. This voltage will have a value equal to the line voltage, plus any voltage on the inductor 76 at the time of discharge. This is desirable in the illustrated embodiment since the voltage across the capacitor 83 must be maintained at a level above the peak line voltage in order for the controller 27 to function properly.

The output of the power factor controller 27 on conductor 30 is a relatively flat, boosted DC voltage. This voltage $V_{dc}$ on the conductor 30 is introduced to the square wave invertor 32 as previously discussed. The invertor 32 includes a pair of switches 90, 92 which are connected in common to conductor 34 and in series between the conductors 30 and 72. These power switches 90 and 92 are opened and closed by a control circuit 94. When the switch 90 is closed and the switch 92 is open, the conductor 30 is coupled to the conductor 34. When the switch 92 is closed and the switch 90 is opened, the conductor 72 is coupled to the conductor 34. Thus, under the control of the circuit 94, the respective switches 90 and 92 introduce to the conductor 34 a positive voltage from the conductor 34 and a ground potential from the conductor 72. This results in the alternating voltage which is common to most invertors. This switching in the invertor 32 will be better understood with reference to the structure present in the transformer and resonant invertor circuit 36.

In a preferred embodiment, this circuit 36 includes a transformer 100 having a primary winding 101 and a secondary winding 102, and a turns ratio of 1 to 2. The primary winding 101 of the transformer 100 is connected between the conductor 34 and a terminal 103 which is common to two capacitors 105 and 107. The opposite terminals of capacitors 105 and 107 are connected respectively to the conductor 30 and the conductor 72. It is the purpose of these capacitors 105 and 107 to act as a voltage divider for the DC voltage across capacitor 83. Capacitors 105 and 107 also provide a very low impedance path to allow the AC current to pass to conductors 30 and 72 depending on the switching positions of switches 90 and 92 as described below.

In operation, when the switch 90 is closed and the switch 92 is open, current flows from the conductor 30 through the switch 90 and the primary winding 101 and through the capacitor 107 to the ground potential on conductor 72. In the alternative, when the switch 92 is closed and the switch 90 is open, the current on conductor 30 passes through the capacitor 105 into the primary winding 101 through the switch 92 to the ground potential on conductor 72. Thus when the invertor 32 is in a first state, current flows in the primary winding 101 from the conductor 34 to the terminal 103. But when the invertor 32 is in its second state, the current flows through the primary winding 101 in the opposite direction from the terminal 103 to the conductor 34. The primary current may lead or lag the primary voltage which depends upon the resonant frequency and the switching frequency.

With specific regard to the starting and control of discharge lamps 10, this controller 27 and associated circuitry provides for the gentle ramping up of the voltage to the lamp 10 until the lamp starts. After the lamp starts the impedance of the load changes significantly. The controller 27 responds by adjusting voltage and frequency in the system to operate the lamp 10 at its optimum frequency and proper power level. During the starting of the lamp, the load current signal in a preferred embodiment is predominant over the voltage signal from the bulk capacitor; after the lamp has started the signal from the bulk capacitor is predominant over the lamp current signal. This variable voltage control is of particular advantage because it contains all of the necessary information to continuously optimize the ballast operation.

Figure 9:
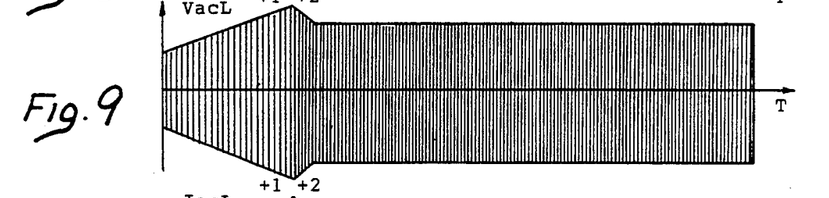
FIG. 9 is a plot of the voltage across the lamp $V_{acl}$ of the present invention.
Figure 10:
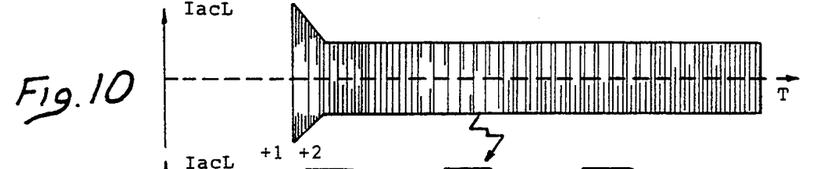
FIG. 10 is a plot of the current envelope through the lamp $I_{acl}$ of the present invention.
Figure 11:
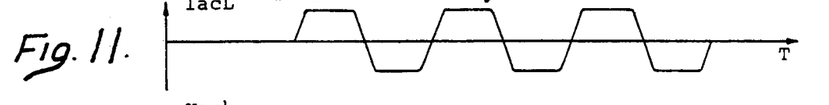
FIG. 11 is a plot of the current $I_{acl}$ of FIG. 10 expanded to show its substantially square waveform.

The secondary winding 102 of the transformer 101, which is constructed to produce approximately 1 mH of leakage inductance. In this embodiment is connected across the resonant capacitor 117 and two lamps 110, 112 in series. This winding 102 sees transformation as a resonant sine waveform. A plot of the sinusoidal voltage $V_{acl}$ envelope across the lamps 110, 112 is shown in FIG. 9 while a plot of the lamp arc current $I_{acl}$ envelope is shown in FIG. 10. The highly desirable square wave characteristics of the lamp arc current $I_{acl}$ is shown in FIG. 11 and is representative of the extremely low crest factor associated with the ballast 12 of this invention. By sensing and controlling the average current value rather than peak current value, the PWM pre-regulator converter 75 maintains the same extremely low level of distortion in the line current over the full range of current value. This is achieved even though the required boost inductor value is quite low. This means that the mode boundary between continuous and discontinuous modes, that is inevitable at some low current value, is of no concern since the loop controls and average value or current. As a result, the ballast 12 has the capability of operating the pre-regulator converter 75 in either the continuous or discontinuous mode.

Thus the potential which is seen by the lamps 110 and 112 is an alternating voltage having an amplitude which is controlled by frequency and the Q of the resonant tank. Such an inductor may be external or, as in the case in the illustrated embodiment, designed into the transformer 100 as leakage inductance.

Figure 12:
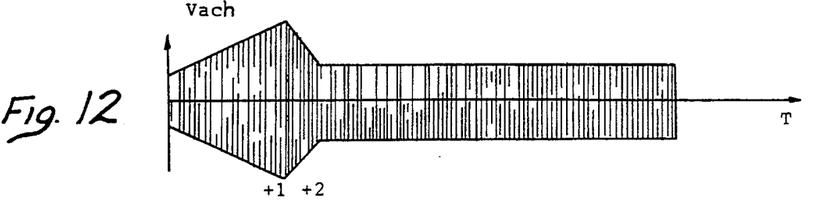
FIG. 12 is a plot of the voltage across the heater of the lamp $V_{ach}$.

In the illustrated embodiment, winding 101 functions as a primary winding with respect to the main secondary winding 102, but the winding 102 also functions as a primary winding with respect to three smaller electrode heater windings 115, 116 and 118. The voltage applied to the heater windings is designated $V_{ach}$, and is illustrated in the plot of FIG. 12.

A bypass or starting capacitor 121 is connected across one of the lamps, such as the lamp 112. It is the purpose of this capacitor 121 to initially allow the voltage potential to bypass the lamp 112 until the lamp 110 has fired. At this point the voltage potential on capacitor 121, and therefore across the lamp 112, is sufficient to fire the lamp 112.

A current transformer 125 is connected between the secondary winding 102 and the lamp 110. The current transformer 125 in a preferred embodiment is unique, and specially designed for this discharge lighting application with a turns ratio of 1:200. A transformer meeting these specifications is manufactured by Pulse Engineering Inc. and marketed under the Model No. 51688. This transformer 125 includes a primary winding 127, which receives the lamp current $I_{acl}$ once the lamps 110, 112 have fired, and a secondary winding 129 which is connected to a crest factor circuit 130. In this circuit 130 one terminal of the secondary winding 129 is connected through a diode 136 to a conductor 134. The parallel combination of a resistor 137 and a capacitor 139 is connected between the other terminal of the secondary winding 129 and the conductor 134.

Figure 13:
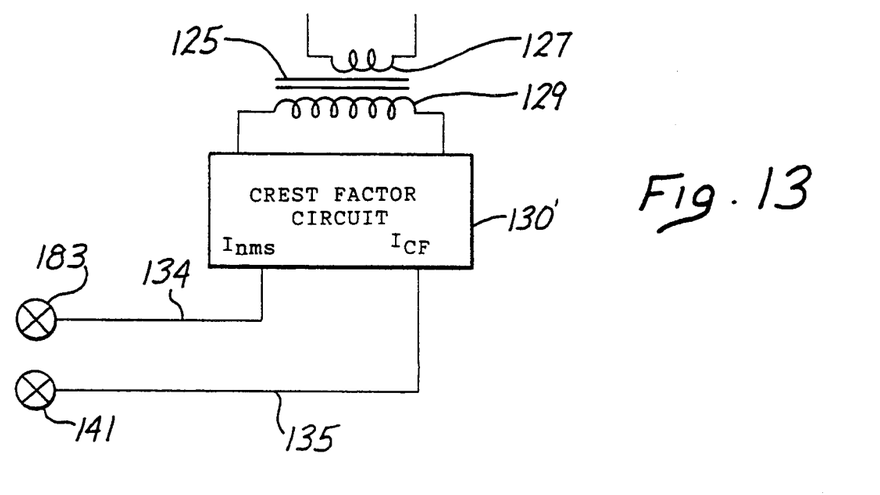
FIG. 13 is a detailed schematic of an alternate embodiment of the ballast illustrated in FIG. 2.

An alternative embodiment of the crest factor circuit 130 is illustrated in FIG. 13 and designated by the reference numeral 130'. In this embodiment the circuit 130' provides two outputs within the feedback signal processor 47. The first signal is a current $I_{rms}$, representative of the true RMS value of the lamp arc current $I_{acl}$. This current is provided on the conductor 134. The second output of the circuit 130' is a current $I_{cf}$ representative of the crest factor of the lamp arc current $I_{acl}$. This current is provided on a conductor 135. Both of these signals $I_{cf}$ and $I_{rms}$ can be derived in a conventional manner from the wave form of the lamp arc current $I_{acl}$.

The signal on conductor 134 is introduced into a summing circuit 141 where it is compared against a reference $V_{ref2}$. The resulting output is introduced to an operational amplifier and compensation network which functions as an error amplifier in a feedback control circuit 154. The output signal from the circuit 154 is added to the signal on conductor 30 and compared against a reference $V_{ref1}$ in a summing circuit 156. The resulting signal from the circuit 156 is introduced to an error amplifier 158. This amplifier 158 provides its output on the conductor 50 to the power factor controller 27 and the variable voltage control circuitry in the feedback signal processor 47.

In the controller 27, the output of the error amplifier 158 is introduced to a divider circuit 161 which divides the signal by the square of a voltage that is representative of the true RMS value of the line voltage, and introduces the quotient to a multiplier 163. The divisor voltage for the divider circuit 161 is produced by sampling the rectified voltage signal on conductor 70 through a resistor/capacitor network including resistors 165, 167, 169 and capacitors 170, 172 which are connected as illustrated in FIG. 2. The resulting voltage $V_{FF}$ is multiplied by itself in a squaring circuit 173 and the quotient is introduced to the divider circuit 161.

The output from the divider circuit 161 is multiplied by a current signal $I_{ac}$ in the multiplier circuit 163. The current signal $I_{ac}$ which is introduced through a resistor 174 to the multiplier 163, is representative of the rectified voltage on conductor 70.

The output of the multiplier circuit 163 is introduced to a current amplifier 175 and is used as a reference for the signal input to the current amplifier 175 on a conductor 176. The signal on conductor 176 is created by sensing the current on conductor 72.

The output of the current amplifier 175 is introduced to a pulse width modulation circuit 178 which compares this signal to the saw-tooth waveform output of a variable frequency oscillator 181. The output of the pulse width modulation circuit 178 controls operation of the gate drive 85.

This oscillator 181 is at the end of a signal path which begins at the current sensor 43 and includes a summing circuit 183, a second feedback control circuit 185, and the oscillator 181. The summing circuit 183 receives its input on the conductor 134 from the current sensor 43. The true RMS output $I_{rms}$, from the sensor 43 is introduced to the summing circuit 183 where it is compared against a reference $V_{ref3}$. The output of the summing circuit 183 is the difference between these two signals. This output is introduced to the second feedback control circuit 185 and the resulting signal is introduced to the variable frequency oscillator 181 where it is used to control the output frequency of the oscillator 181.

As noted, the oscillator 181 provides an input to the pulse width modulation circuit 178. The circuit 178 in turn controls the gate drive 85 and consequently the duty cycle of the power switch 87. Since the drive 85 preferably functions at a high frequency, the oscillator 181 in the preferred embodiment provides a range of frequencies between 40 kHz and 100 kHz.

Figure 14:
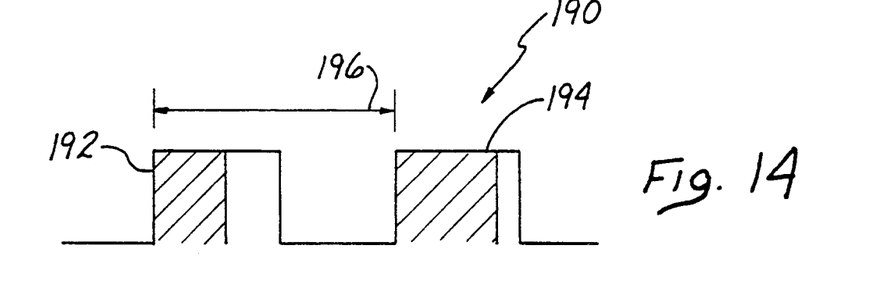
FIG. 14 illustrates a series of pulses which can be introduced to a gate drive in the ballast of FIG. 2.

As the current amplifier 175 provides a first input to the modulation circuit 178 in the form of a integrated inductor current waveform, the oscillator 181 provides a second input in the form of a sawtooth waveform which is synchronized with the system clock. The output from the pulse width modulator 178 is introduced to the gate drive 85 as a series of pulses, which control the average boost inductor current. The pulses also cause the current tot be in phase with the voltage and to have the same waveform shape as the voltage. In FIG. 14, these pulses 190 include the pulse 192 and the pulse 194. The distance separating these pulses 192, 194 is related to the wave length associated with the frequency of the pulses. This wavelength is illustrated in FIG. 14 by the arrow 196.

The pulses 192, 194 also have a duty cycle which is associated with the pulse width, the shaded areas in FIG. 14, and the wave lengths 196. This pulse width can be varied to fill the entire wavelength 196, al of the space between adjacent pulses. The percentage of the pulse width divided by the total possible area, the wavelength 196, is referred to as the duty cycle. Thus the duty cycle of the pulse 192 is approximately 25%, or one-fourth of the wavelength 196. Since the shaded area represents the time during which the switch 87 is closed, an increase in the shaded area or duty cycle increases the time during which the capacitor 83 is charged. A variation of the frequency represented by the wavelength 196 also affects this charge cycle.

The duty cycle of the pulse stream 190 is dependent upon the signal from a voltage control loop 205 while the frequency of the pulse stream 190 is dependent upon the signal from a frequency control loop 207, both discussed in greater detail below.

In the illustrated embodiment the switching of the converter and invertor 32 are synchronized. To achieve complete switching synchronization a 2:1 ratio (or integer multiple thereof) must be maintained between the frequencies of the pre-regulator converter 75 and invertor 32. As an example, the invertor 32 may be operated at 50 kHz and the boost converter 75 operated at a synchronized 100 Khz. This higher converter frequency contributes to reducing the size of the pre-regulator converter inductor 76 and making it easier to operate the inductor in a more efficient continuous mode. Additional benefits of operating the inductor 76 in a continuous mode are higher efficiency, less stress on the boost converter power switch 87 and bulk capacitor 83, and less noise back to the line. In many applications the noise back to the line is so low that the system can be operated with no line filters and at substantial savings. Although a preferred embodiment includes a boost converter configuration, a flyback or a buck configuration could also be used.

In a preferred embodiment of the invention, the following components are provided on a single chip manufactured by Unitrode, Inc. and marketed under the Model No. UC 3854:

| Gate Drive | 85 |
|---|---|
| Error Amplifier | 158 |
| Divide Circuit | 161 |
| Multiplier | 163 |
| Squaring Circuit | 174 |
| Current Amplifier | 175 |
| Pulse Width Modulator | 178 |
| Frequency Oscillator | 181 |

Turning now to the square wave invertor 32, it will be noted that the synchronized pulse from the oscillator 181 is also introduced to the divider 54 which reduces the oscillator frequency by a factor "N". The output of the divider 54 is introduced to the control circuit 94 which dictates the opening and closing of the switches 90, 92. In a preferred embodiment wherein the frequency of the oscillator 181 varies between 40 KHz and 100 KHz, and the divisor N is equal to 2, the opening and closing of the switches 90, 92 occurs at a frequency between 20 KHz and 50 KHz.

Although the gate drive 85 and the switch control circuit 94 can function at different frequencies, it is of particular importance that they be turned on in synchronism so that the switches 90, 92 are closed at the same time that the switch 87 is closed. Failure to achieve this result could create undesirable noise in the control circuitry which in turn would reduce the level of control. This synchronous operation can be effected by insuring that the divisor 54 either divides or multiplies the frequency of the oscillator 181 by an integer value N. Thus, in synchronous embodiments the value of N is an even valued integer, such as ¼, ½, 2, 4, or 6. Non-synchronous operation, which would result from an odd integer such as 1, 3, 5, or 7, could be employed if the control circuitry were sufficiently protected from the electrical noise produced in such an operation.

The present invention can be best understood by separating the high power electrical section from the signal processing section and its related power supply. Referring to FIG. 2, the high power electrical section includes the power line filter 18, the power rectifier 23, the power boost convertor (including inductor 76), the power capacitor 83, and the power bridge (including switches 90, 92) with its power transformer output to the lamp load 10. The signal processing section includes novel analog and digital control techniques such as the voltage control loop 205, the frequency control loop 207, and the power factor controller 27. The voltage control loop 205 includes the summation circuit 141, the feedback control circuit 154, the summation circuit 156, and the error amplifier 158. The frequency control loop 107 includes the summation circuit 183, the feedback control circuit 185 and the variable frequency oscillator 181.

The signal processing section is of particular interest to the present invention. Since a discharge lamp represents essentially a negative impedance, this characteristic can cause the lamp to oscillate widely due to the rapid changes that occurs in the lamp load at the moment of ignition. First, the voltage across the lamp must rise high enough to ignite the lamp and then in order to prevent the lamp from running away, after ignition, the current through the lamp must be regulated by a proper impedance.

In accordance with the present invention, the voltage control loop 205 contributes to at least three primary functions which are of particular significance to the present invention. Each of these functions relates to the regulation of the DC voltage level across the power capacitor 83.

The first primary function associated with the voltage control loop 205 relates to the ability of the ballast circuit 12 to produce a constant light output from the lamps 110, 112 over a wide range of input voltages.

The second primary function associated with the voltage control unit 205 relates to the ability of the ballast circuit 12 to provide a variable DC voltage across the power capacitor 83. This in turn controls the voltage across the secondary winding 102 of the transformer 110, 112. The voltage control loop 205 greatly increases the control over the lamp current $I_{acl}$.

This DC voltage control is of particular advantage to the present invention because it permits any lamp to be started at its minimum voltage and to run at its optimum power level with a current waveform that is substantially square. In order to achieve this square waveform with the lamp arc current at the proper power level, the lamp 10 must be operated very close to its resonant frequency. It is further desirable for the lamp 10 to be operated at a voltage that is controllable at a level that is very close to its operating voltage, typically ten to forty volts above the lamp running voltage. This advantage will be particularly appreciated by those who adhere to the industry standard which requires that the lamp starting voltage be maintained at a minimum of two times the lamp running voltage. With proper application of the present invention, the lamp arc current can be maintained with a crest factor far below the industry standard of 1.4. In fact, proper power levels and lamp arc current crest factors as low as 1.08 have been attained with the present invention.

The third primary function of the voltage control loop 205 is to enable the lamps 110, 112 to be started with an optimum electrode preheat time and a minimum glow discharge time. This is achieved by providing heat for the electrodes 115, 116 and 118 over a sufficient period of time to produce the desired thermionic emission temperature. Then the voltage across the lamps 110, 112 can be quickly ramped up until the they ignite. Following this ignition, the voltage across the lamps 110, 112 is reduced to a level typically from ten to forty volts above the lamps' running voltage.

Referring now to the frequency control loop 207, it can be appreciated that this circuit contributes to at least two primary functions associated with the ballast circuit 12. First, the frequency control loop 207 controls the running frequencies to achieve zero voltage switching below the resonant frequency (less than half resonant frequency) and hence the power levels associated with the lamps 110, 112. Second, the frequency control loop 297 provides for synchronization of the gate drive 85 in the boost converter section of the controller 27, and the control circuit 94 associated with the output circuit. These two functions work in concert to achieve higher efficiencies and hence lower cost in the invertor section. This result is achieved primarily from a reduction in the circulating currents associated with the resonant invertor 36 under preheat running and open circuit conditions which significantly decreases power losses and cost in the present invention.

A unique advantage associated with running the boost converter section at a frequency which is some integer multiple of the frequency of the output section, is that it allows the boost converter to operate more efficiently. Generally it is more desirable to operate the discharge lamps 110, 112 at about 20 KHz. However, it is also desirable to run the boost converter at 40 KHz, 80 KHz or even higher frequencies. By running the boost converter at the higher frequencies, the size of the inductor 76 can be significantly reduced while operating in the continuous mode. A further advantage associated with this continuous mode is that the input signal on conductor 70 has less ripple and therefore gives the power factor controller lower total harmonic distortion with increased control. This generally contributes to a higher power factor for this system and lower harmonics and RFI/EMI.

The frequency control loop 207 works in concert with the voltage control loop 205 to properly regulate the lamps 110, 112. This is accomplished by sensing the current through the lamp 10 before and after it fires, and subsequently adjusting the frequency of the output power section. As the frequency changes, the impedance of the leakage inductance within the output transformer 100 (or an external inductor), changes thereby regulating the current level through the lamp 110, 112. This enables the ballast circuit 12 to provide a different power level for different types of lamps such as standard lamps and energy saving lamps.

The frequency control loop 207 also provides the necessary synchronization control between the boost converter 75 (including inductor 76) and the power bridge section (including switches 90, 92). This synchronization is of particular importance for two reasons. First, by running the boost converter at an integer multiple of the frequency of the power bridge section, it allows the boost converter to run in the preferred continuous mode while using a smaller inductor 76 with fewer turns of wire. Thus there is lower loss within the inductor 76 and its windings, and lower loss within the power switch 87.

Second, with the synergistic control of both frequency and voltage, variations in the lamp current $I_{acl}$ can be rapidly controlled. This rapid control facilitates accurate shaping of the current waveform to preferred square wave configurations. The perfection of this waveform is typically measured as the quotient of peak current divided by the true RMS of the peak current, and is commonly referred to as the crest factor. A perfect square wave form would have a crest factor of unity. With the present invention, a crest factor less than about 1.35 can be achieved. In one embodiment wherein the crest factor is about 1.2, imperfections in the waveform can no longer be detected as variations in the illumination of the lamp 10. In a further embodiment, a crest factor as low as 1.08 has been achieved. Although this represents the lower crest factor and therefore the most economic operation for the system, this embodiment may suffer from increased RFI from the lamp due to the sharp rising edge of the square current waveform. Based on all the considerations which must be balanced in a choice of crest factors, it is believed that the most practical embodiment is that providing a crest factor of about 1.2.

As noted, the voltage $V_{dc}$ on the conductor 30 gradually rises until the lamps 110, 112 ignite. This gradual rise is referred to herein as a "soft-start". It insures that each individual lamp, regardless of its type, age or even the temperature of its environment, will start at its minimum voltage, no more and no less. This greatly reduces the trauma associated with a lamp starting cycle. Thus the soft-start feature insures the longest possible lamp life.

This soft-start feature is achieved when the output of the feedback circuit 154 is summed with the DC voltage $V_{dc}$ on the conductor 30. As this voltage $V_{dc}$ gradually rises with the change on capacitor 83, it reaches a level where the lamp 10 will fire. This is sensed by the current sensor 43 to trigger an immediate reduction in power to the lamp 10.

The variable voltage control feature is also advantageous in that it enables the lamp 10 to operate at the lowest possible current crest factor. In the absence of current flowing through the lamp 10 before ignition, the current sensor 43 allows the DC voltage $V_{dc}$ to continue to rise until the lamp fires. As soon as this occurs, the current sensor 43 processes the signal from feedback circuit 154 to reduce the DC voltage on conductor 30 to a specific optimum running voltage for the lamp 10. Ultimately this creates the best possible crest factor for lamp arc current $I_{acl}$ at the proper power level.

Figure 15:
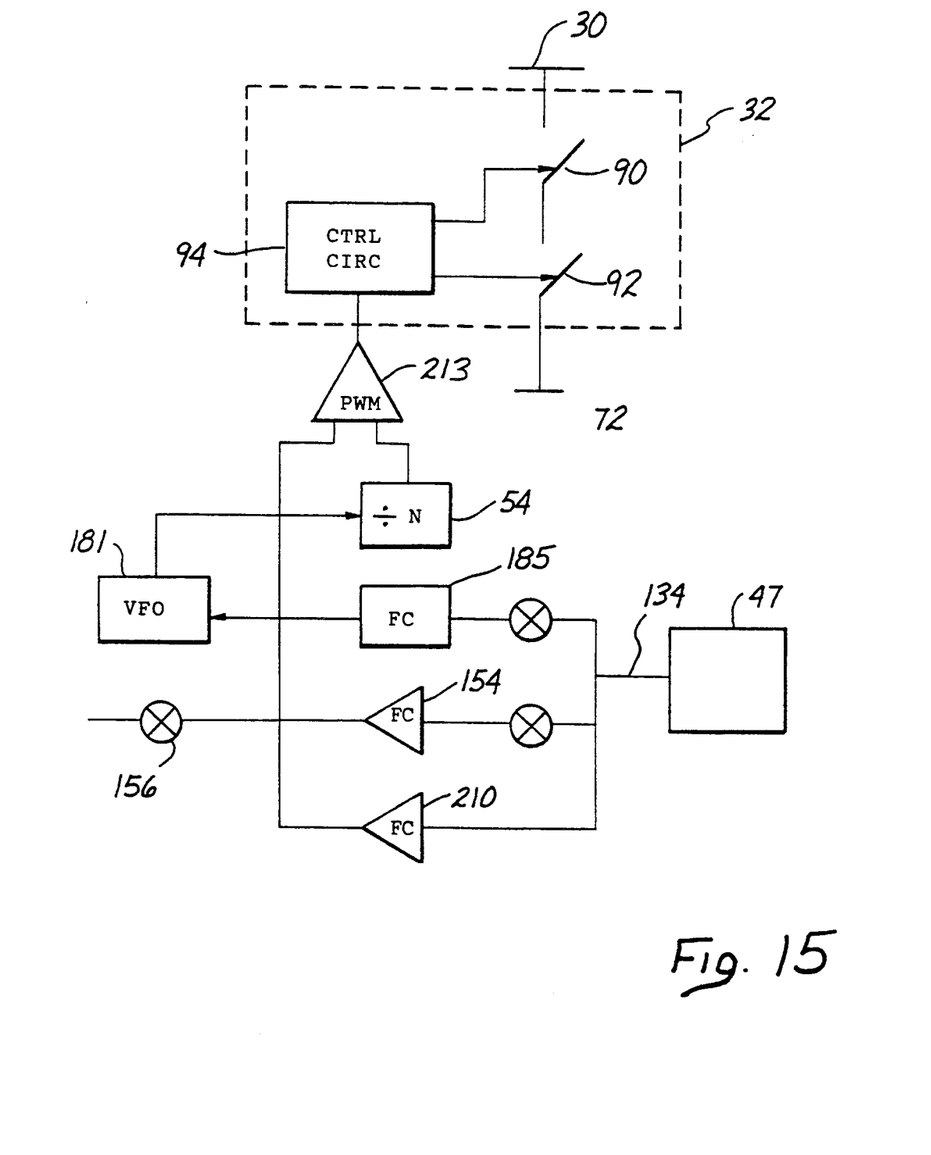
FIG. 15 is a block diagram of an alternate embodiment of the ballast illustrated in FIG. 2.
Figure 16:
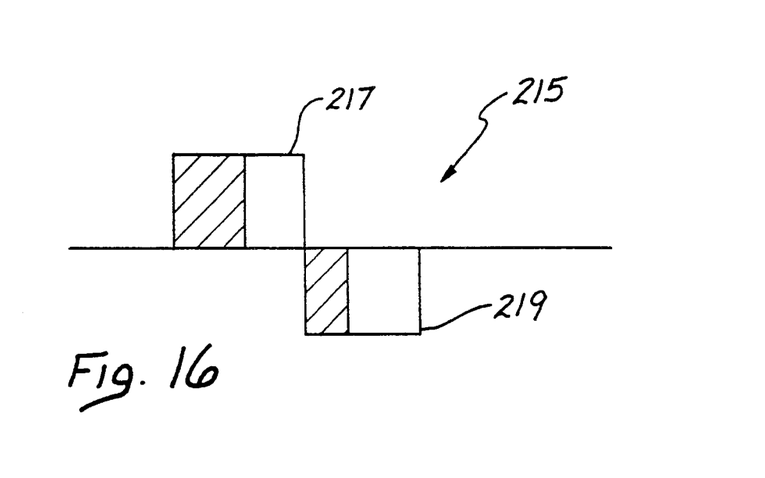
FIG. 16 illustrates a series of pulses which can be introduced to a control circuit in the ballast of FIG. 2.

A further embodiment of the invention is particularly advantageous for controlling a load, such as a motor, having a variable impedance. This embodiment, best illustrated in FIG. 15, provides for the pulse width modulation of the control circuit 94 so that operation of the switched 90, 92 can be more independently controlled. In this embodiment, a third feedback circuit 210 receives an input from the signal processor 47 on line 134. The output of this circuit 210 is introduced to a pulse width modulator 213 along with the signal from the divider circuit 54. The output of the pulse width modulator 213 is introduced to the control circuit 94 and takes the form of a series of pulses 215 as illustrated in FIG. 16. These pulses include a pulse 217 which controls operation of the switch 90 and a pulse 219 which controls operation of the switch 92.

With the signal processing provided by the modulator 213, these two pulses 217 and 219 can be provided with a variable duty cycle. For example, the shaded area of the pulse 217 could represent the time during which the switch 90 is closed while the shaded area in the pulse 219 represents the time during which the switch 92 is closed. With a capability to independently vary the duty cycle of these two pulses 217 and 219, a much higher degree of control can be exercised in the square wave invertor 32.

With the foregoing discussion of the best mode for practicing the invention, many variations in the concept will now be apparent, particularly to those skilled in the art of ballast design. For example, the output section of the circuit can be varied considerably. An inductor could be placed in series with the load, or a choke could be used. In both these instances, the output section would not require a transformer. It will also be apparent that the various feedback loops could be responsive to many different characteristics associated with the line, load or environment. A particular error signal might be derived from the voltage across the load or the power factor or crest factor associated with the load. The various control loops could be responsive to the same load characteristic or two different characteristics each associated with the load.

With the numerous possibilities and variations in this concept, one should not determine the scope of this invention with reference merely to the embodiments illustrated and disclosed; rather, specific attention should be directed to the following claims.

We claim:

1. Apparatus for controlling the illumination of a discharge lamp having a particular impedance, the apparatus comprising:
   means for introducing electrical power to the discharge lamp, the power being characterized by a voltage and a frequency and at least the voltage of the electrical power being variable;
   means for ramping the voltage of the electrical power upwardly to a particular magnitude sufficient to fire the discharge lamp; and
   a control circuit responsive to the firing of the discharge lamp at the particular magnitude of the voltage for varying the voltage of the electrical power after the discharge lamp has fired thereby reducing the operating power of the discharge lamp.

2. The apparatus recited in claim 1 wherein both the frequency and voltage of the electrical power are variable and the control circuit comprises:
   means responsive to the firing of the discharge lamp for varying the voltage of the electrical power to a magnitude below the particular magnitude thereby reducing the operating power of the discharge lamp; and
   means responsive to the firing of the discharge lamp for varying the frequency of the electrical power thereby reducing the operating power of the discharge lamp.

3. The apparatus recited in claim 2 wherein the voltage decreasing means reduces the operating power by a fraction having a numeration equal to unity and a denomination comprising a number greater than unity.

4. The apparatus recited in claim 3 wherein the number is an integer.

5. The apparatus recited in claim 4 wherein the number is an even integer.

6. The apparatus recited in claim 5 wherein the number is 2.

7. A ballast for controlling the operation of a discharge lamp having characteristics including a firing voltage and a minimum running voltage, comprising:
   a source of power providing a voltage with characteristics including a variable amplitude;
   means for applying the voltage to the lamp and for increasing the magnitude of the applied voltage from a magnitude less than the firing voltage to a magnitude equal to at least the firing voltage;
   means responsive to the firing of the lamp for providing a particular signal having characteristics indicative of the firing of the lamp; and
   the source being responsive to the particular signal of the providing means for reducing the magnitude of the applied voltage to the particular magnitude less than the firing voltage but greater than the minimum running voltage.

8. The ballast recited in claim 7 wherein the particular magnitude of the applied voltage is less than 1.2 times the minimum running voltage of the discharge lamp.

9. The ballast recited in claim 7 wherein:
   the source provides the voltage with characteristics including a variable amplitude and a variable frequency; and
   the source is responsive to the particular signal of the providing means to vary both the amplitude and the frequency of the applied voltage.

10. The ballast recited in claim 7 wherein the applied voltage has a waveform characterized by a crest factor less than about 1.35.

11. The ballast recited in claim 10 wherein the applied voltage has a waveform characterized by a crest factor less than about 1.2.

12. The ballast recited in claim 11 wherein the applied voltage has a waveform characterized by a crest factor less than about 1.08.

13. Apparatus for controlling the illumination of a discharge lamp in an environment characterized by a temperature, the apparatus comprising:
   means for introducing an alternating current voltage across the lamp, the voltage having a variable magnitude;
   means for increasing the voltage across the lamp to a particular magnitude sufficient to fire the lamp, the particular magnitude of the voltage being dependent upon the temperature of the environment; whereby
   the lamp is fired with a voltage not greater than that required to fire the lamp in the environment.

14. The apparatus recited in claim 13 wherein the increasing means ramps the voltage across the lamp upwardly to the particular magnitude.

15. The apparatus recited in claim 14 wherein the increasing means ramps the voltage upwardly linearly across the lamp.

16. An electrical power controller providing a rapid response to fluctuating power requirement of a load, comprising:
   a source of electrical power;
   induction means coupled to the source and having properties for storing electrical energy;
   capacitor means for storing an electrical charge;
   a control circuit coupled between the induction means and the capacitance means, the control circuit releasing the electrical energy from the induction means to the capacitance means in the form of pulses having a variable duty cycle;
   an inverter responsive to a the electrical charge across the capacitance means for providing an output signal to the load;
   means responsive to the power consumed by the load for providing an error signal; and
   means responsive to the error signal for varying the duty cycle of the pulses.

17. The power controller recited in claim 16 wherein the pulses of energy in the control circuit have a variable duty cycle and a variable frequency, and the controller further comprises:
   clock means responsive to the error signal for varying the frequency of the pulses.

18. The power controller recited in claim 17 wherein the clock means is a first clock means and the inverter includes:
   a transformer;
   first switch means for introducing the electrical charge of the capacitance means through the transformer in a first direction to create a first output signal;

second switch means for introducing the electrical charge of the capacitance means through the transformer in a second direction to create a second output signal;

second clock means for controlling operation of the first switch means and second switch means; and means for synchronizing the first clock means and the second clock means.

19. The power controller recited in claim 18 wherein each of the first and second output signals have a frequency and a duty cycle and the second clock means includes means for varying the duty cycle of at least one of the first and second output signals.

20. The power controller recited in claim 18 wherein the first clock means has a frequency and the synchronizing means includes:

means responsive to the first clock means for providing the second clock means with a frequency equal to the frequency of the first clock means divided by an even integer.

21. The power controller recited in claim 20 wherein the integer is 2.

22. The power controller recited in claim 18 wherein the first clock means has a frequency and the synchronizing means includes:

means responsive to the first clock means for providing the second clock means with a frequency equal to the frequency of the first clock means multiplied by an even integer.

23. A two stage power controller, including:

a first stage comprising a boost converter having a capacitor with a charge which provides a first output signal;

means included in the first stage for charging the capacitor with a series of first pulses having a first frequency;

a second stage comprising an inverter having a second output signal for powering the load;

means included in the second stage and responsive to the first output signal of the first stage for energizing the inverter with a series of second pulses having a second frequency; and the first frequency of the first pulses being an integer multiple of the second frequency of the second pulses.

24. The two stage power controller recited in claim 23 further comprising means responsive to the power being consumed by the load for providing an error signal;

means included in the charging means and responsive to the error signal for pulse width modulating the first pulses; and means included in the energizing means and responsive to the error signal for pulse width modulating the second pulses.

25. The two stage power controller recited in claim 23 wherein the means providing the error signal is responsive to current passing through the load to provide the error signal with characteristics representative of the RMS value of the current passing through the load.

26. The two stage power controller recited in claim 24 wherein the means providing the error signal includes means providing a first error signal representative of the RMS value of the current passing through the load; and means providing a second error signal representative of the crest factor of the current passing through the load; and means for pulse width modulating the first pulses is responsive to the second error signal varying the duty cycle of the frequency of the pulse width modulation and is responsive to the second error signal for varying the duty cycle of the pulse width modulation.

27. The two stage power controller recited in claim 24 wherein the means providing the error signal includes means providing a first error signal representative of the RMS value of the current passing through the load;

means providing a second error signal representative of the crest factor of the current passing through the load; and means for pulse width modulating the second pulses as including means responsive to the first error signal for varying the frequency of the pulse width modulation and means responsive to the second error signal for varying the duty cycle of the pulse width modulation.

* * * * *